United States Patent
Seraj

(10) Patent No.: US 6,535,745 B1
(45) Date of Patent: Mar. 18, 2003

(54) PAGING NETWORK OPTIMIZATION UTILIZING HANDOFF STATISTICS

(75) Inventor: Jila Seraj, Dallas, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/464,655

(22) Filed: Dec. 15, 1999

(51) Int. Cl.[7] .............................................. H04Q 7/20
(52) U.S. Cl. ...................... 455/458; 455/436; 455/435
(58) Field of Search .................................. 455/458, 435, 455/432, 560, 436, 426, 440, 422, 403; 340/7.2

(56) References Cited

U.S. PATENT DOCUMENTS 5,907,810 A * 5/1999 Subramanian et al. ...... 455/458
6,122,522 A * 9/2000 Lee ............................. 455/458
6,138,025 A * 10/2000 Lee et al. ................... 455/435

* cited by examiner

Primary Examiner—William Trost
Assistant Examiner—Rafael Perez-Gutierrez

(57) ABSTRACT

A method of defining a location area within the service area of a wireless network utilizes paging traffic and handoff traffic statistics. Initially, a cell having the highest volume of paging traffic is identified and marked as belonging to a working location area. The cell having the highest volume of handoff traffic with the cell in the working location area is selected and a determination is made to determine if the combined paging traffic of the first and second cells exceeds the maximum paging capacity for a location area within the service area. If the maximum paging capacity has not been exceeded, then the second cell is added to the working location area. The process continues until all cells, except for the occasional dead cell, have been allocated to a location area.

30 Claims, 9 Drawing Sheets

PAGING NETWORK OPTIMIZATION UTILIZING HANDOFF STATISTICS

TECHNICAL FIELD

This invention relates in general to wireless communication networks and applications and, in particular, to a method and system of defining locations areas within a paging area consisting of a plurality of cells utilizing the paging traffic and handoff traffic statistics related to the cells.

BACKGROUND OF THE INVENTION

Without limiting the scope of the invention, its background is described in connection with defining a location area within a service area of a wireless communications network, as an example.

Present-day mobile telephony has spurred rapid technological advances in both wireless and non-wireless areas. The communications industry is a rapidly growing industry, with advances, improvements, and technological breakthroughs occurring on an almost daily basis. Many mobile communications systems, among them the European GSM-system, have already passed through several basic development phases, and system designers are now concentrating on further improvements to the systems, including system refinements and the introduction of optional services.

Most wireless communication systems currently in use are implemented as wireless communication networks. Wireless communication networks typically are composed of a group of Base Transceiver Stations (BTS), or base stations connected to a centrally located switch. This centrally located switch is commonly referred to as a Mobile Switching Center (MSC). The MSC contains definitions for Location Area, Paging Area, Satellite Paging Area, Inter-Exchange Paging Area, Service Area, Paging Extent, Paging Priority and the parameters associated with them. The MSC also contains registration parameters that are essential for the proper functioning of the paging network.

A typical wireless communications network also includes a group of interconnected MSCs, which operate in association with a gateway mobile switching center through which the wireless communications network interconnects with a conventional Public Switched Telephone Network (PSTN). In addition, at least one Home Location Register (HLR) operates within the wireless communications network. The HLR stores network subscriber information via registration, including the currently serving MSC for location of the current mobile stations within the network.

In response to an incoming call dialed to a mobile station, a signal is sent to the HLR requesting routing information through the network to the called mobile station. The HLR "looks up" the current location of the mobile station and contacts the currently serving MSC to pre-route the call and retrieve a temporary location directory number, which is utilized to route the call through the communications network for delivery to the mobile station. The serving MSC retrieves from a Visitor Location Register (VLR) the identification of the location area within which the called mobile station is currently located. The VLR's function, among others, is to update its records based on the mobile station's activity and registration and inform the mobile station's HLR when the mobile station becomes active or inactive.

A location area is a collection of cells that covers a geographic area, or coverage area. All cells in the MSC should belong to a defined location area. If a cell is not associated with a location area, it belongs to the default location area, which is referred to as the basic location area. A collection of location areas is then commonly referred to as a paging area. Paging areas can cross MSC borders and include location areas from other MSCs. Each location area should be associated with a defined paging area, and a location area may belong to more than one paging area.

Once the MSC receives a request for paging a mobile station, it searches for that mobile station's record in the VLR. Upon identifying the location of the mobile station using information found in the VLR, the MSC then instructs the base station(s) associated with that particular location area to page the mobile station. If no response, then the MSC might page the paging area associated with the location area. If, however, the VLR has no record for that mobile station, the location area for that mobile station is considered unknown. The MSC will then page its entire service area (all cells in that MSC) to find the mobile station. This results in a waste of system resources.

When a mobile station migrates from the coverage area of one location area to another, it registers with the MSC. In reality, there are occasions when the registration is unsuccessful due to the radio conditions (e.g., low signal strength or interference), or because the mobile is busy with other activities. Registering allows the MSC to know the location of the mobile station. In turn, the MSC uses this information to page the mobile station more efficiently. However, if the size of the location area is too small, there is a risk that the mobile station will not be found when paging in its latest known location areas, and thus paging becomes inefficient. On the other hand, if the location area is too large, then too many cells are paged unnecessarily and paging occurs in a much larger area than is necessary.

The task of grouping cells into location areas and paging areas is more an art than a science. Network engineers and wireless service providers are faced with the problem of defining location areas which may be too small given that the number of registrations increase as a mobile station moves from one location area to another. Thus, an overwhelming amount of system resources are consumed.

Presently, location areas are defined by grouping cells in a wireless communications network utilizing paging traffic statistics collected and stored by the MSC or switch equipment. Typically, counters for each cell track the number of pages and page responses. The maximum number of pages per second per location area (assuming that such information or an approximation of it is available) and the contribution of each cell to the paging are utilized in determining whether the location area can handle the amount of pages. Furthermore, natural boundaries, such as mountains and rivers are factored into defining the borders of the location areas within their respective paging area.

This prior art method, or approach, for defining and optimizing location areas within a paging area of a wireless communications network does not utilize the handoff traffic between adjacent cells. For example, if the traffic moves from one of these cells frequently to the other cell, there is a large possibility that the mobile stations move from the coverage area of one cell to the coverage area of the other cell in a very short period of time. As such, current methods are unsuitable for today's modern wireless network. What is needed is a more efficient and accurate method and system for defining a location area in a wireless communications network utilizing existing paging traffic and handoff traffic statistics would provide numerous advantages. A method and system that reduces the number of registrations, consumes less network resources and allows for paging of a mobile station subscriber more efficiently is needed for defining location areas within the paging areas of the network.

SUMMARY OF THE INVENTION

The present invention provides a method and system for defining location areas in a wireless communications network utilizing existing paging traffic and handoff traffic statistics. With the present invention, the service provider can expect to see a decrease in the number of registrations, less network resources being consumed during the paging process and more efficient paging of a mobile station subscriber.

Accordingly, disclosed in one embodiment, is a method for use in a wireless communications network of defining location areas utilizing the paging traffic and handoff traffic statistics related to the cells in the network service area. The method comprises the steps of identifying a first cell within the paging area of the network having the highest volume of paging traffic and marking the first cell as belonging to a working location area.

Next, a second cell in the paging area is identified, the second cell being adjacent to the working location area and having the highest volume of handoff traffic with the cells in the working location area. Once the second cell has been identified, a determination is made if the combined paging traffic of the first and second cells exceeds the maximum paging capacity for a location area within the service area of the network. If the maximum paging capacity of the location area has not been exceeded, the second cell is added to the working location area.

If the second cell is added, the method further comprises the step of identifying a third cell adjacent to the working location area. The third cell is identified as as an adjacent cell to the working location area having the highest volume of handoff traffic with the cells within the working location area. The process continues until no more cells can be added to the working location area without exceeding the maximum paging capacity. At that point, the working location area becomes a defined location area within the network.

The remaining cells in the network are similarly allocated to working location areas and then to defined location areas until all cells, except for the occasional dead cell, have been allocated to a defined location area. By considering the combined paging capacity of cells which are selected for their handoff characteristics with neighboring or adjacent cells, better optimization of network resources is achieved in the wireless communications network.

Technical advantages of the present invention include a decrease in the number of registrations, less network resources being consumed during the paging process and more efficient paging of a mobile station subscriber within its location area.

BRIEF DESCRIPTION OF THE DRAWINGS

For a more complete understanding of the present invention, including its features and advantages, reference is now made to the detailed description of the invention, taken in conjunction with the accompanying drawings of which.

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

Figure 1:
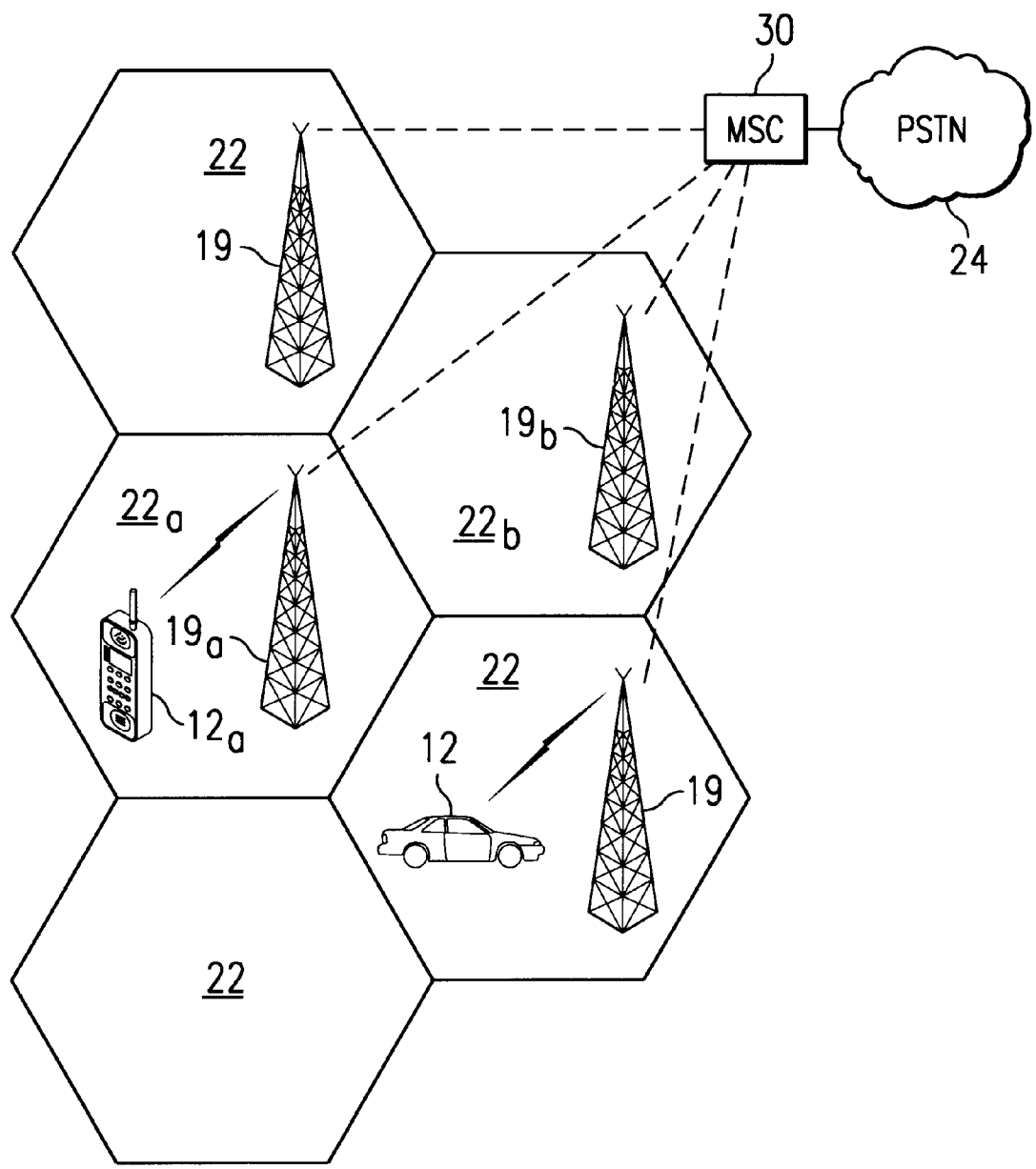
FIG. 1 shows a diagram of a wireless communications network.

With reference to FIG. 1, therein is shown a diagram of a wireless communications network 10. The network 10 includes a mobile station (MS) 12, which can be a wireless communications device such as a Personal Communications Service (PCS) or cellular phone, but may also include a computer, a Personal Digital Assistant (PDA), or other wireless terminal, for example. A base station 19 provides cellular coverage via a radio frequency (RF) link to the MS 12 and other mobile stations within the cells 22 of network 10. The terms "cell" or "cells" will be referred to interchangeably. Typically, several base stations 19 service a single MSC 30 either by direct connection or through base station controllers (BSCs) to provide continuous geographical coverage. For illustrative purposes only, the coverage area of a particular cell 22 is shown as hexagonal.

As the MS 12a moves between a first cell 22a to a second cell 22b, service (a call or data transmission) is handed off from a first base station 19a servicing the MS 12a in the first cell 22a to a second base station 19b in the second cell 22b. As the MS 12a crosses the region serviced by the base station 19b in the second cell 22b, the MS 12a is arriving at the transfer of the communication from the first base station 19a to the second base station 19b (called a "handoff"). A hand-off is typically managed by control systems contained in the Mobile Switching Center (MSC) 30. MSC 30 is typically in communication with multiple BSCs, as well as to nodes in the fixed networks, such as the Public Switched Telephone Network (PSTN) 24 or an optical network, for example.

Figure 2:
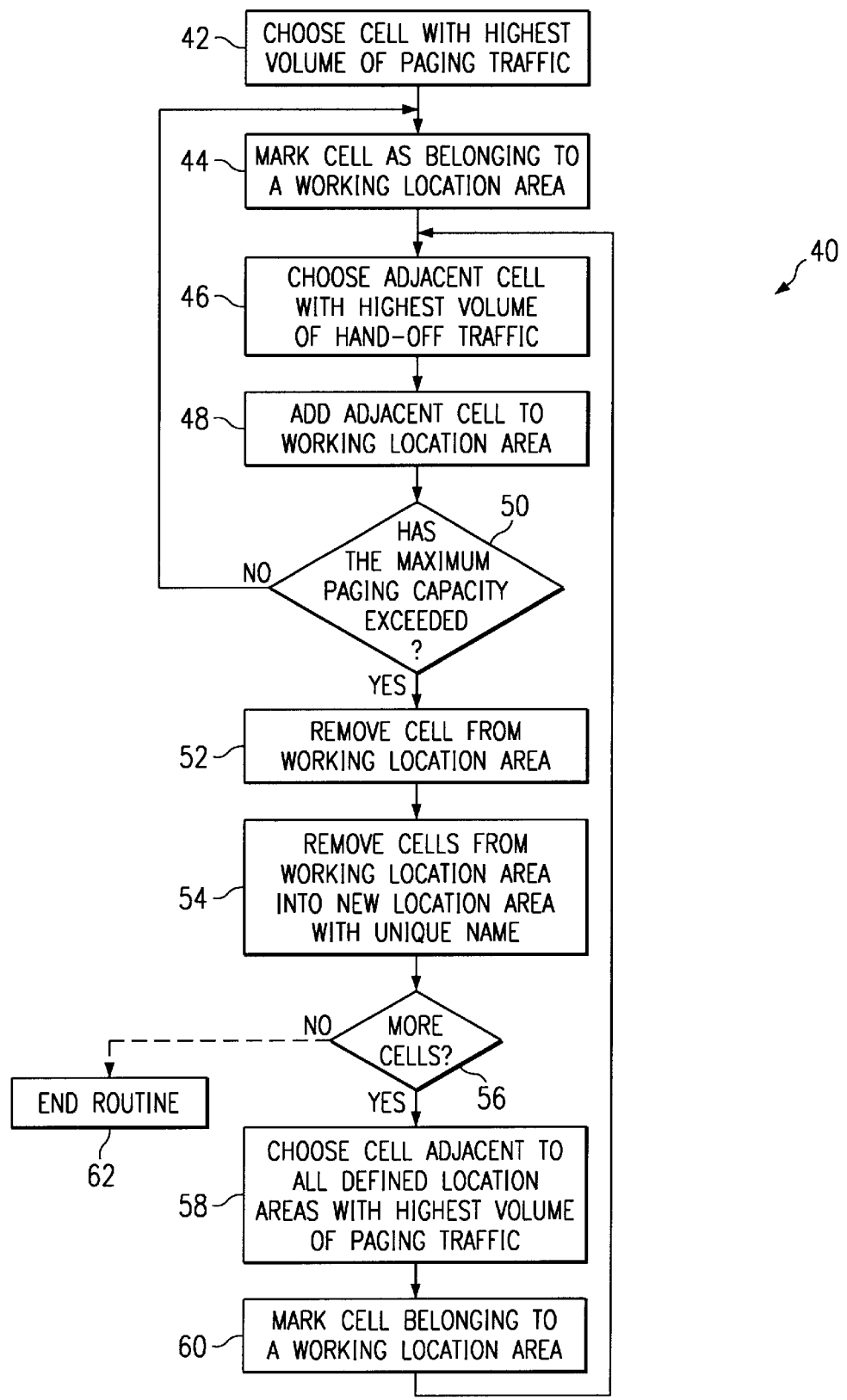
FIG. 2 is a flow diagram illustrating process steps for implementing the method and system of the present invention, in accordance with the preferred embodiment.

With reference to FIG. 2, therein is shown a process flow diagram, denoted generally as 40, for a method of defining a location areas consisting of a plurality of cells in a wireless communications network utilizing the paging traffic and handoff traffic statistics of the cells, according to one embodiment of the present invention. The process of defining a location area begins at step 42 where a cell with the highest volume of paging traffic of a wireless network is identified. This cell is then marked at step 44 as a cell belonging to a working location area. A second cell, adjacent to the working location area, having the highest volume of handoff traffic to all the cells in the working location area, is then identified at step 46 and added at step 48 to the working location area.

Once the second cell has been added to the working location area, it is then necessary at step 50 to determine if the maximum paging capacity of the location area has been exceeded. The maximum paging capacity is predetermined by the network provider. As such, the paging traffic of the two cells are added together and compared to the predetermined amount. If the maximum paging capacity has not been exceeded by the two cells in the working location area, the second cell is then marked at step 44 as a cell belonging to the working location area.

A third cell, adjacent to the working location area and having the highest volume of handoff traffic with all the cells in the working location area is then identified at step 46 and added to the working location area at step 48 in continuing the process. If, however, the maximum paging capacity of the working location area has been exceeded by the combined paging traffic of the first, second and third cell at step 50, then the last cell added, or the third cell here, is removed from the working location area at step 52. The remaining cells in the working location area are then removed at step 54 into a new location area with a unique name.

In optimizing the paging area, all cells must be accounted for in a location area. As such, determining if more cells remain occurs at step 56. If there are no cells remaining, the process of defining location areas is terminated at step 62. If, however, there are more cells, then the cell adjacent to all the defined location areas with the highest volume of paging traffic is identified at step 58. This cell is then marked at step 60 as belonging to the working location area. Once the cell has been marked, the process continues at step 46 in choosing a cell adjacent to the working location area with the highest volume of handoff traffic with the cells within the working location area. The cell is then added at step 48 to the working location area, and the paging traffic of the cells in the working location area is combined to determine at step 50 whether the maximum paging capacity has been exceeded.

To better understand the invention, reference is made to FIGS. 3A thru 3G which illustrate the process of the present invention used to define location areas within the service area of a wireless network consisting of a plurality of cells. Specifically, with reference to FIG. 3*a*, therein is shown a wireless communications network including service areas 72 consisting of a plurality of cells 82, and denoted generally as 70. A service area 72 comprises all paging areas, location areas 74 and any gaps or pockets. Thus, a paging area is a collection of location areas 74 and may contain location areas from more than one service area 72, and a location area 74 is a collection of cells 82 having a predetermined maximum paging capacity.

For illustrative purposes, only one service area 72 is shown to include location areas 74 and cells 82. Each service area 72 also comprises a MSC 30, or switching equipment associated with these cells 82 which define the location areas 74. It is the MSC 30 which houses data about the cells 82 which can be utilized to determine the trade off points in including or excluding cells 82 into a location within a service area. That is, in using the data from MSCs 30 concerning handoff, it is possible to determine the flow of traffic between two adjacent cells. If the flow of traffic is strong, it indicates that these cells shall belong inside the same location area. If, on the other hand, the volume of traffic in one location area is large and causes paging congestion, it is advisable to remove one high traffic cell out of the location area for best optimization. In this case, the volume of handoff between cells indicates which cell is the best candidate to be removed from the location area.

Figure 3A:
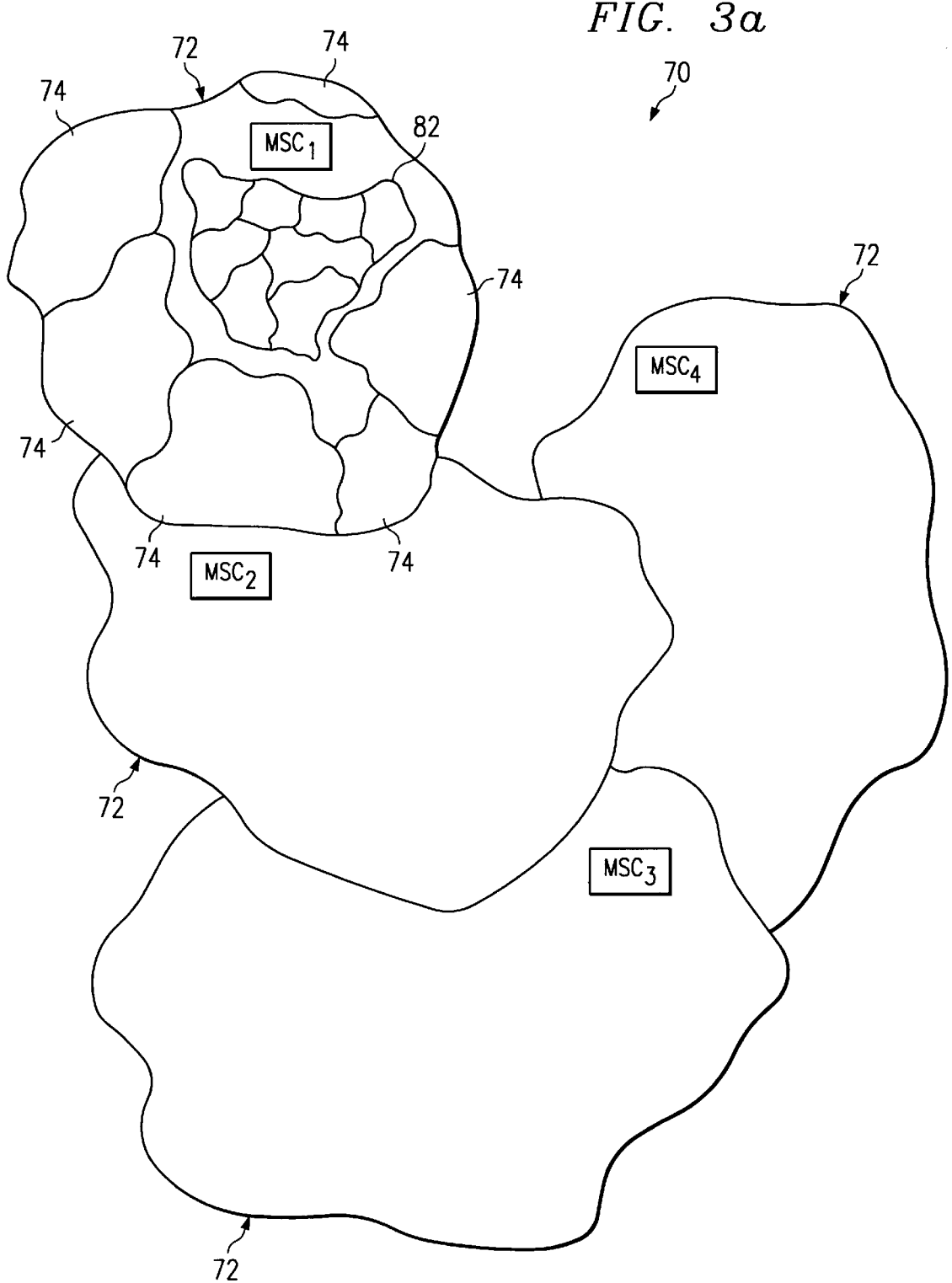
FIGS. 3A–3G illustrate the method of defining a location area within a paging area of the network utilizing the paging traffic and handoff traffic statistics of the cells.
Figure 3B:
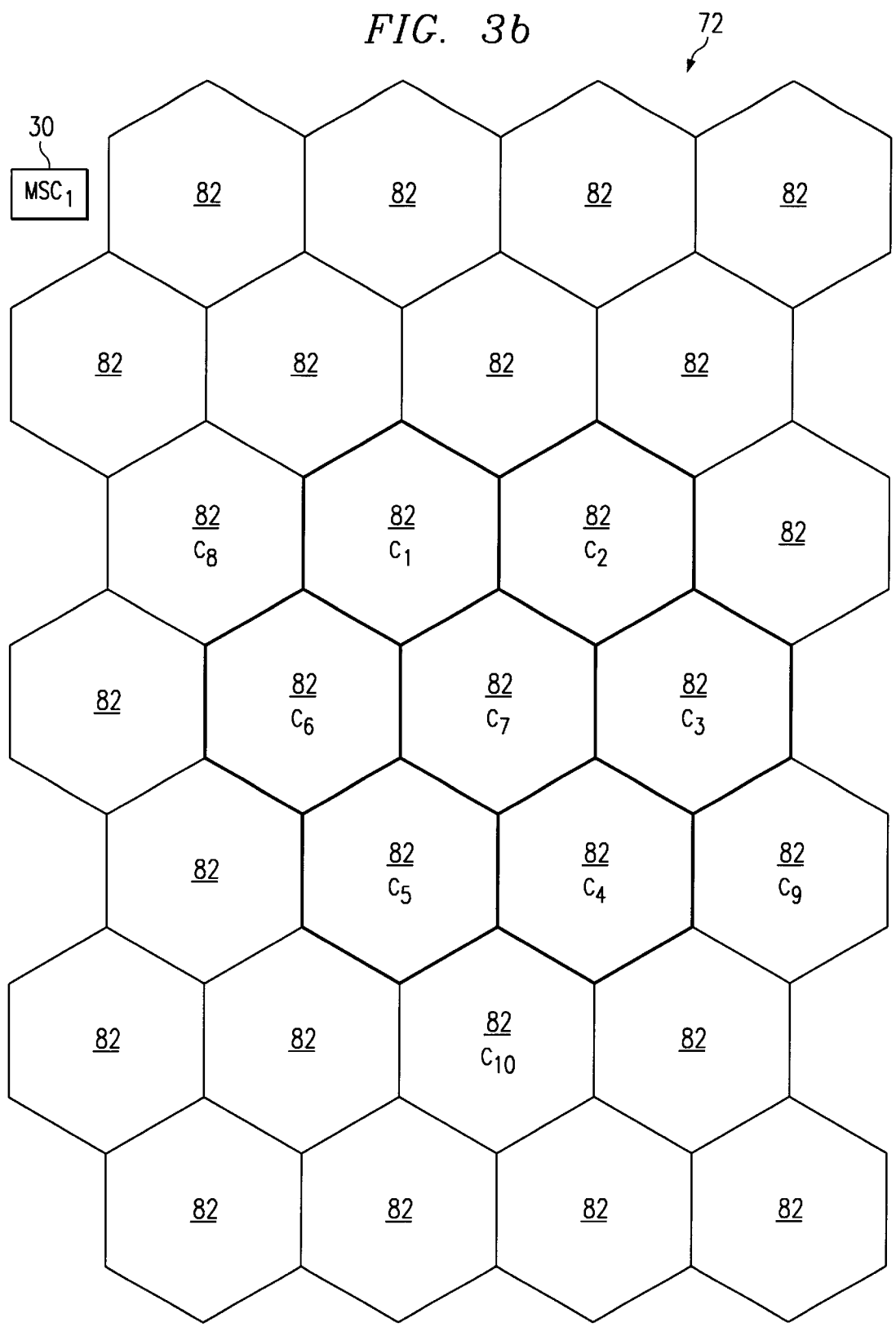

For example, with reference to FIG. 3*b*, therein is shown a service area 72 comprising a plurality of cells 82 including C1 thru C10. Currently, service area 72 consists of a plurality of location areas defined by a group of cells 82. For better optimization of service area 72, it is necessary to redefine the location areas utilizing paging traffic and handoff traffic statistics related to cells C1 thru C10 available from its associated MSC 30. This will result in a decrease in the number of registrations, less network resources being consumed during the paging process and more efficient paging of a mobile station subscriber within its location area. For illustrative purposes only, the coverage area of a particular cell 82 is shown as hexagonal.

Figure 3C:
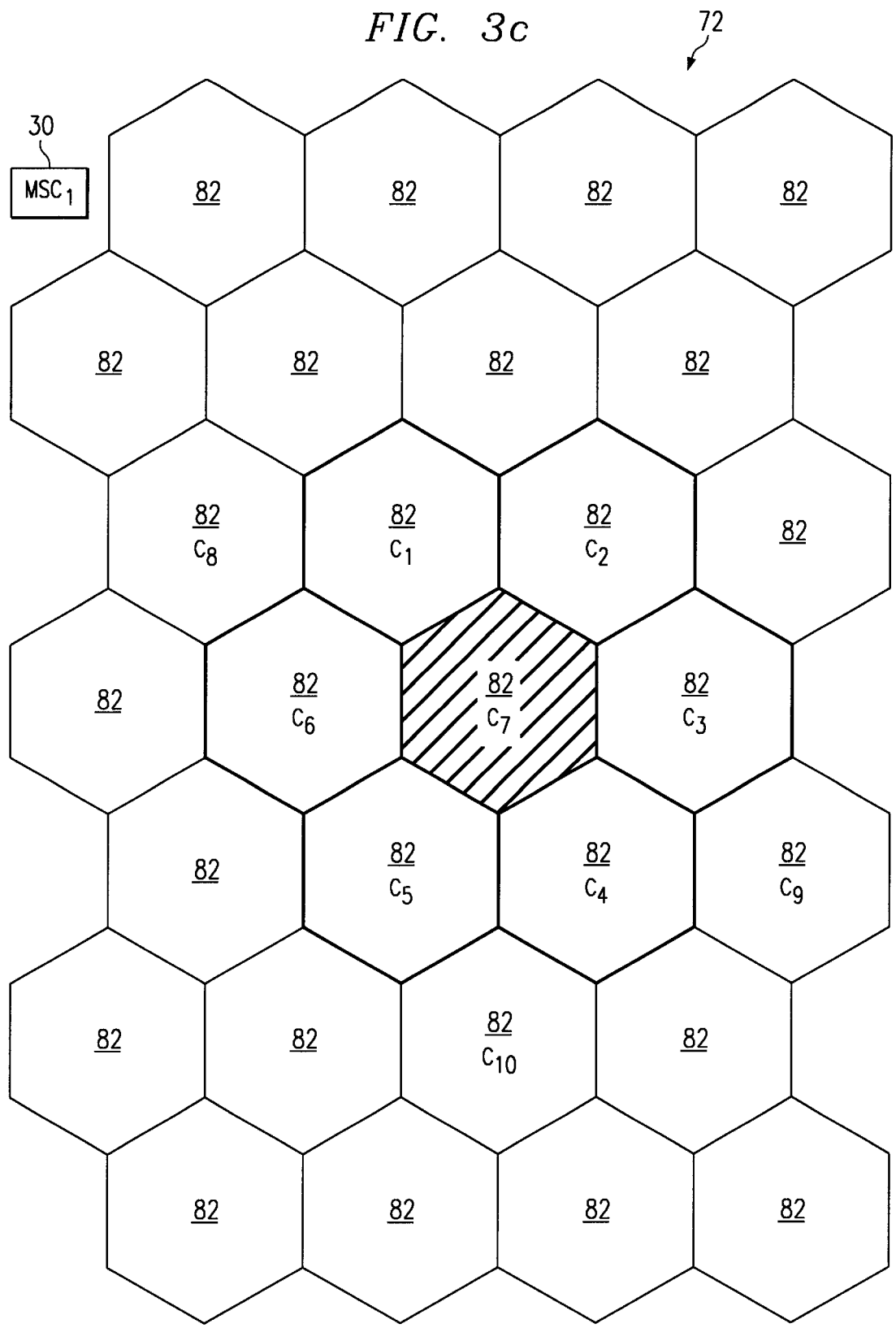

In redefining location areas 74 in a service area 72 for maximum optimization, a first cell having the highest volume of paging traffic is identified and marked as belonging to a working location area. Cell C7 is assumed to have the highest volume of paging traffic in service area 72 and is therefore shaded to show it is in the working location area (FIG. 3*c*).

Figure 3D:
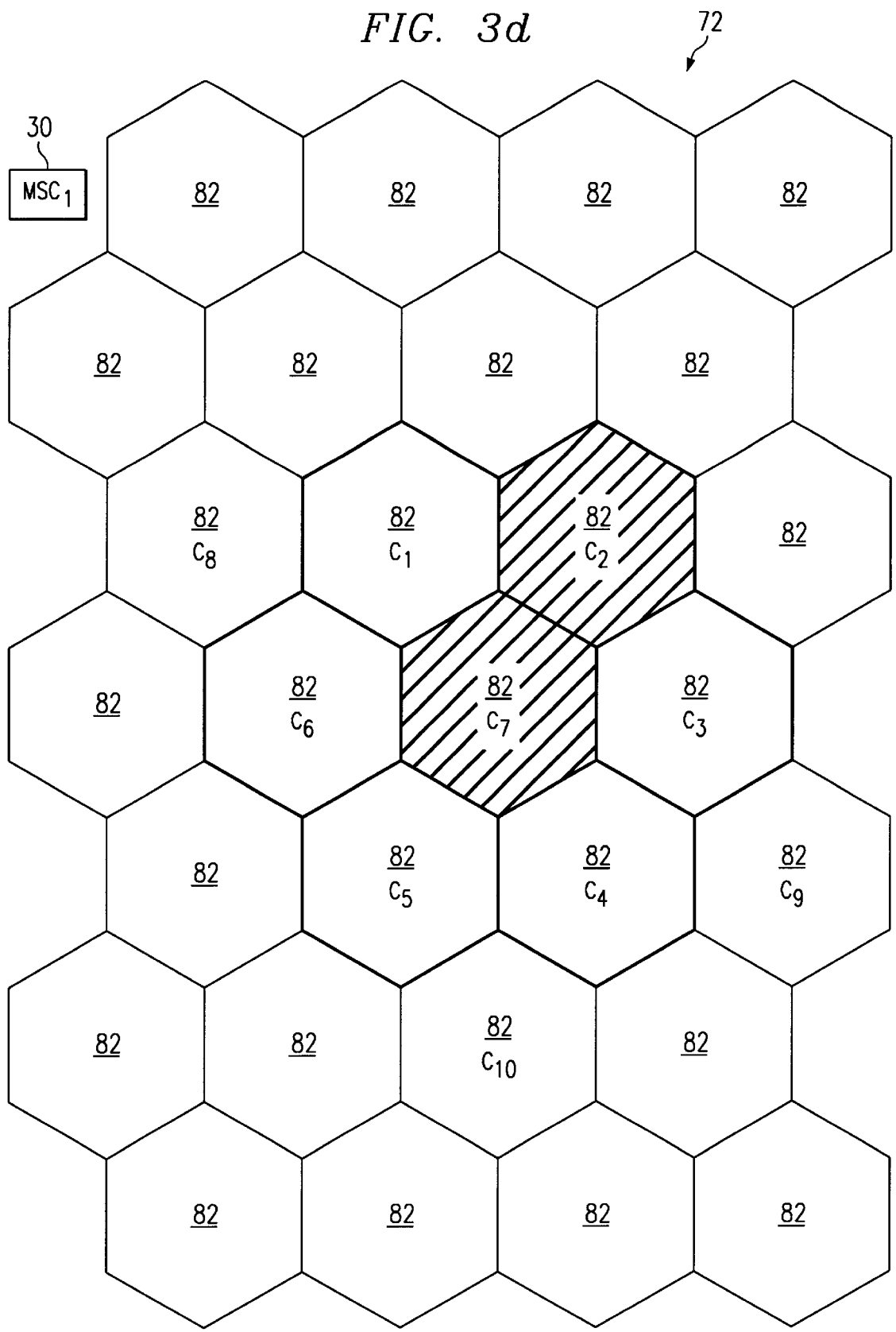

Next, a second cell, adjacent to the working location area (e.g., C7) and having the highest volume of handoff traffic with all the cells in the working location area is identified. Here, cells C1–C6 are found to be adjacent to the working location area (e.g., C7). C2 is determined to have the highest volume of traffic with all the cells in the working location area. The paging traffic of the cells in the working location area must then be combined in order to determine if the maximum paging capacity has been exceeded. If the maximum paging capacity of the working location area (e.g., C7, C2) has been exceeded by the combined paging traffic of all the cells which make up the working location area, then the last cell added, or C2, is removed. Cell C2 then remains in the service area for later assignment of other location areas. If, however, the maximum paging capacity has not been exceeded by the combined paging traffic of all the cells which make up the working location area, then C2 is marked and added to the working location area as shown in FIG. 3*d*.

Figure 3E:
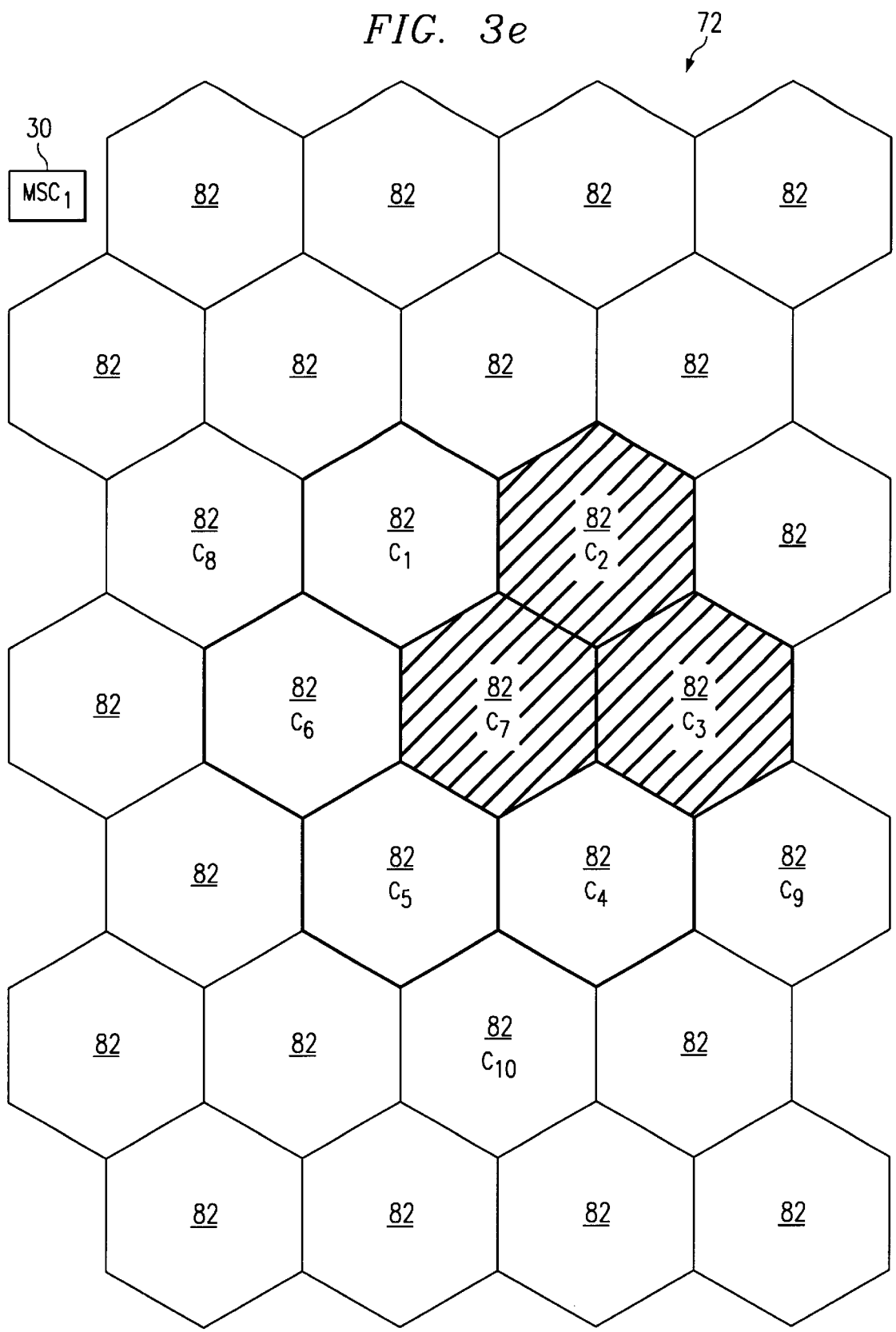

As a result, a third cell is identified as being adjacent to the working location area (e.g. C7, C2) and having the highest volume of handoff traffic with the cells within the working location area. Cell C3 is determined to have the highest volume of handoff traffic with all the cells in the working location area. Once again, the paging traffic of the cells in the working location area (e.g., C7, C2 and C3) must be combined in order to determine if the maximum paging capacity has been exceeded. If the maximum paging capacity has not been exceeded, then cell C3 is marked and added to the working location area as shown in FIG. 3*e*. If, however, the maximum paging capacity has been exceeded by adding cell C3, then cell C3 is removed from the working location area. By removing cell C3 from the working location area, cell C3 then remains in the service area and is available for assingment to another location area.

A fourth cell may now be identified since the maximum paging capacity has not been exceeded in the working location area. Again, the fourth cell must be adjacent to the working location area (e.g. C7, C2, C3) and must have the highest volume of handoff traffic with the cells in the working location area. For illustrative purposes, cell Q9 is determined to have the highest volume of handoff traffic with the cells in the working location area.

Figure 3F:
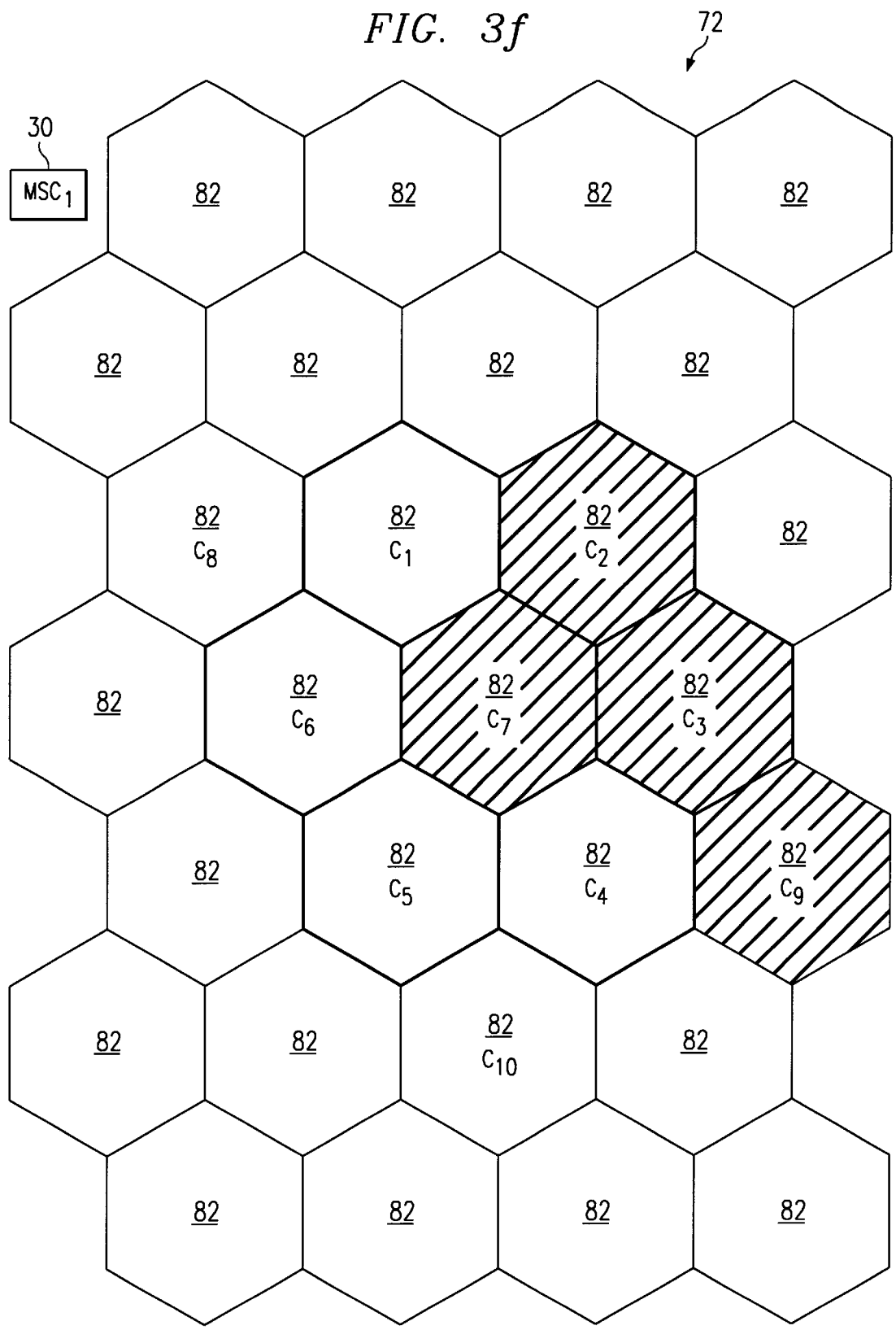
Figure 3G:
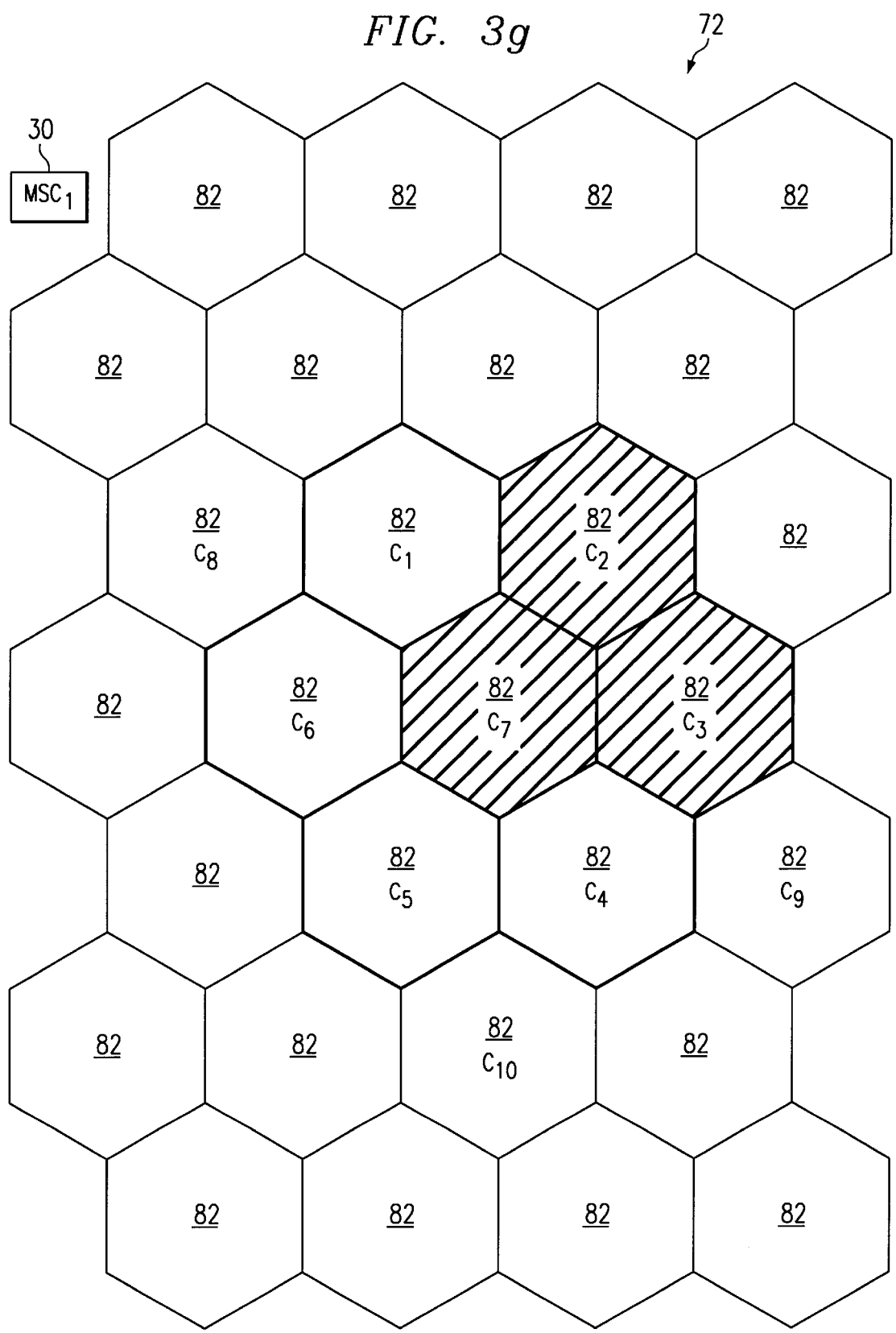

Once again, the paging traffic capacity of the cells in the working location area must be combined and compared to the maximum paging capacity allotted to each location area within service area 72. If the maximum paging capacity has not been exceeded, then cell C9 is marked and added to the working location area as shown in FIG. 3*f*. If, however, the maximum paging capacity has been exceeded, then cell C9 is removed from the working location area as shown in FIG. 3*g*. That is, C9 will remain in service area 72 for assignment to another location area which will provide better optimization.

In removing C9 from the working location area, the new defined location area comprises cells C7, C2, and C3 as shown in FIG. 3g. These cells are then removed from the working location area and assigned a unique name for identification within the service area 72. The process is then repeated with the remaining cells in the service area 72 until all cells have been grouped in the appropriate location area utilizing their paging traffic and handoff traffic statistics. Such method of defining location areas within a service area results in a decrease in the number of registrations, less network resources being consumed during the paging process and more efficient paging of a mobile station subscriber.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. For example, while the process for defining location areas is described as a method of allocating all cells to a defined location area, it is understood by those skilled in the art that application of the process may result in a few cells not being assigned to a location area or result in a cell being suitable for assignment to more than one location area. In such instances, those skilled in the art will appreciate that the final allocation of remaining cells may employs techniques and methodologies, not disclosed herein, to assign such cells to location areas. It is, therefore, intended that the appended claims encompass any such modifications or embodiments.

What is claimed is:

1. In a wireless communications network including a service area consisting of a plurality of cells, a method of grouping said cells into a plurality of location areas within said network service area utilizing paging traffic and handoff traffic statistics related to said cells, the method comprising the steps of:
    defining a first location area within said service area of said network; and
    distributing remaining cells in said service area into a plurality of location areas until no other cells can be added to the location areas without exceeding the maximum capacity for a location area in said service area,
    wherein said defining step further comprises the steps of:
        identifying a first cell within the service area of said network having the highest volume of paging traffic;
        marking said first cell as belonging to a working location area;
        identifying a second cell in said service area, said second cell having the highest volume of handoff traffic with the cells in said working location area;
        determining if the combined paging traffic of said first and second cells exceeds the maximum paging capacity for a location area within said service area; and
        adding said second cell to said working location area when the maximum paging capacity has not been exceeded.

2. The method according to claim 1 wherein said adding step is followed by the step of identifying a third cell adjacent to said working location area, said third cell having the highest volume of handoff traffic with the cells in said working location area.

3. The method according to claim 2 wherein said step of identifying a third cell adjacent to said working location area is performed if the maximum paging capacity has not been exceeded by said first and second cells in said working location area.

4. The method according to claim 3 wherein said identifying step is followed by the step of marking said third cell as belonging to a working location area.

5. The method according to claim 4 wherein said marking step is followed by the step of determining if the combined paging traffic of said first, second and third cells exceed the maximum paging capacity for said working location area within said service area.

6. The method according to claim 5 wherein said determining step is followed by the step of adding said third cell to said working location area when the maximum paging capacity for a location area has not been exceeded.

7. The method according to claim 6 wherein said adding step is followed by the step of removing said third cell from the working location area if the maximum paging capacity has been exceeded, said third cell remaining in the service area of said network for assigning to another location area.

8. The method according to claim 6 wherein said step of adding the third cell from the working location area is followed by the step of identifying the cell adjacent to said working location area with the highest volume of handoff traffic with cells in said working location area.

9. The method according to claim 8 further comprising the steps of: identifying cells adjacent to said working location area; and adding said identified cells to said working location area until no other cells can be added to said working location area without exceeding the maximum paging capacity for a location area in said service area.

10. The method according to claim 1 further comprising the step of terminating the process of allocation cells to a working location area when all cells in the service area have been allocated to a defined location area.

11. The method according to claim 1 wherein the step of distributing remaining cells in said service area is performed by distributing cells remaining within the service area that are not within defined location areas.

12. The method according to claim 1 wherein said step of distributing remaining cells in said service area is performed by seeking adjacent cells to a defined location area with the highest volume of paging traffic.

13. In a wireless communications network consisting of a plurality of cells, a system of defining a location area within said service area utilizing the paging traffic and handoff traffic statistics related to said cells, the system comprising:
    a means for identifying a first cell within the service area of said network having the highest volume of paging traffic;
    a means for marking said first cell as belonging to a working location area;
    a means for identifying a second cell in said service area, said second cell having the highest volume of handoff traffic with the cells in said working location area;
    a means for determining if the combined paging traffic of said first and second cells exceeds the maximum paging capacity for a location area within said service area; and
    a means for adding said second cell to said working location area when the maximum paging capacity has not been exceeded.

14. The system according to claim 13 wherein said means for adding further comprises a means for identifying a third cell adjacent to said working location area, said third cell having the highest volume of handoff traffic with the cells in said working location area.

15. The system according to claim 14 wherein said means for identifying a third cell adjacent to said working location area is configured to perform if the maximum paging capacity has not been exceeded by said first and second cells in said working location area.

16. The system according to claim 14 wherein said means for identifying is further comprises a means for marking said third cell as belonging to a working location area.

17. The system according to claim 16 wherein said means for marking further comprises a means for determining if the combined paging traffic of said first, second and third cells exceed the maximum paging capacity for said working location area within said service area.

18. The system according to claim 17 wherein said means for determining further comprises a means for adding said third cell to said working location area when the maximum paging capacity for a location area has not been exceeded.

19. The system according to claim 18 wherein said means for adding further comprises a means for removing said third cell from the working location area if the maximum paging capacity has been exceeded, said third cell remaining in the service area of said network for assigning to another location area.

20. The system according to claim 18 wherein said means for adding the third cell to the working location area further comprises a means for identifying the cell adjacent to said working location area with the highest volume of handoff traffic with the cells in said working location area.

21. The system according to claim 20 further comprising:
a means for identifying cells adjacent to said working location area; and
a means for adding said identified cells to said working location area until no other cells can be added to said working location area without exceeding the maximum capacity for a location area in said service area.

22. In a wireless communications network including a service area consisting of a plurality of cells, a method of defining a location area within said service area utilizing the paging traffic and handoff traffic statistics related to said cells, the method comprising the steps of:
identifying a first cell within the service area of said network having the highest volume of paging traffic;
marking said first cell as belonging to a working location area; identifying a second cell in said service area, said second cell having the highest volume of handoff traffic with the cells in said working location area;
determining if the combined paging traffic of said first and second cells exceeds the maximum paging capacity for a location area within said service area; and
adding said second cell to said working location area when the maximum paging capacity has not been exceeded.

23. The method according to claim 22 wherein said adding step is followed by the step of identifying a third cell adjacent to said working location area, said third cell having the highest volume of handoff traffic with the cells in said working location area.

24. The method according to claim 23 wherein said step of identifying a third cell adjacent to said working location area is performed if the maximum paging capacity has not been exceeded by said first and second cells in said working location area.

25. The method according to claim 23 wherein said identifying step is followed by the step of marking said third cell as belonging to a working location area.

26. The method according to claim 25 wherein said marking step is followed by the step of determining if the combined paging traffic of said first, second and third cells exceed the maximum paging capacity for said working location area within said service area.

27. The method according to claim 26 wherein said determining step is followed by the step of adding said third cell to said working location area when the maximum paging capacity for a location area has not been exceeded.

28. The method according to claim 27 wherein said adding step is followed by the step of removing said third cell from the working location area if the maximum paging capacity has been exceeded, said third cell remaining in the service area of said network for assigning to another location area.

29. The method according to claim 27 wherein said step of adding the third cell to the working location area is followed by the step of identifying the cell adjacent to said working location area with the highest volume of handoff traffic with cells in said working location area.

30. The method according to claim 29 further comprising the steps of:
identifying cells adjacent to said working location area; and
adding said identified cells to said working location area until no other cells can be added to said working location area without exceeding the maximum paging capacity for a location area in said service area.

* * * * *